VAPOR SEAL FOR DISPENSING NOZZLES

Original Filed July 22, 1969

INVENTOR:
WILLIAM B. HANSEL

BY Donald R. Johnson
ATTY.

United States Patent Office

Re. 28,294
Reissued Jan. 7, 1975

28,294

VAPOR SEAL FOR DISPENSING NOZZLES

William B. Hansel, Media, Pa., assignor to Sun Oil Company of Pennsylvania, Philadelphia, Pa.

Original No. 3,566,928, dated Mar. 2, 1971, Ser. No. 843,719, July 22, 1969. Application for reissue Feb. 5, 1973, Ser. No. 329,934

Int. Cl. B65b *31/06*

U.S. Cl. 141—52 5 Claims

Matter enclosed in heavy brackets [ ] appears in the original patent but forms no part of this reissue specification; matter printed in italics indicates the additions made by reissue.

ABSTRACT OF THE DISCLOSURE

Vapors displaced from a liquid fuel tank by the liquid fuel being dispensed thereinto through a nozzle are collected by means of a flexible bellows which surrounds the nozzle and one end of which is sealed to the fillpipe of the fuel tank.

This invention relates to a sealing device for dispensing nozzles, for example of the type commonly used at service stations to dispense liquid fuel into motor vehicles such as automobiles.

When liquid hydrocarbon fuel (such as gasoline) is dispensed into the fuel tank of a motor vehicle, it displaces vapors from this tank; these displaced vapors contain hydrocarbons in the amount of approximately 0.2% of the fuel delivered. If these vapors were allowed to escape to the atmosphere, the hydrocarbons included therein would add to the air pollution problem. In addition, these vapors, containing as they do combustible components, would present something of a fire hazard to the operator.

In the past, a structure has been proposed for providing a vapor-tight seal between a gasoline dispensing nozzle and a fuel tank, for collecting the vapors displaced from the tank by the entering fuel. This structure, however, functions as a so-called "tight-fill" system, and has mechanical means for both clamping the nozzle in the fillpipe of the tank and also providing force for the seal. This structure incorporates a seal release mechanism, and also an automatic fuel shut-off responsive to a build-up of pressure. This structure comprises a nozzle of somewhat unusual design, with the internal clamping mechanism forming an integral part thereof, and would require the replacement of all presently-existing nozzles with this nozzle of different design. In addition, some fillpipes will not accept this particular clamping mechanism. When this occurs, the automatic nozzle must be held in place by an operator, and this is undesirable.

An object of this invention is to provide a novel vapor seal for fuel dispensing nozzles.

Another object is to provide a vapor seal of simplified design, such that it can be readily applied as an attachment to presently-existing nozzles.

A further object is to provide a vapor seal of universal application, which will perform satisfactorily with all types of fillpipes presently in use.

The objects of this invention are accomplished [;], briefly, in the following manner [;]:

A flexible bellows, sized to surround a dispensing nozzle of conventional construction, has a ring-shaped magnetic sealing assembly at its lower end which is adapted to form a flat face seal at the upper end of a fillpipe into which the nozzle is inserted. The upper end of the bellows sealingly engages the outer surface of the nozzle, and this end of the bellows has a tubular coupling through which the vapors collected in the bellows may be led off for suitable disposition.

A detailed description of the invention follows, taken in conjunction with the accompanying drawing, wherein.

Figures 1, 2, 3:
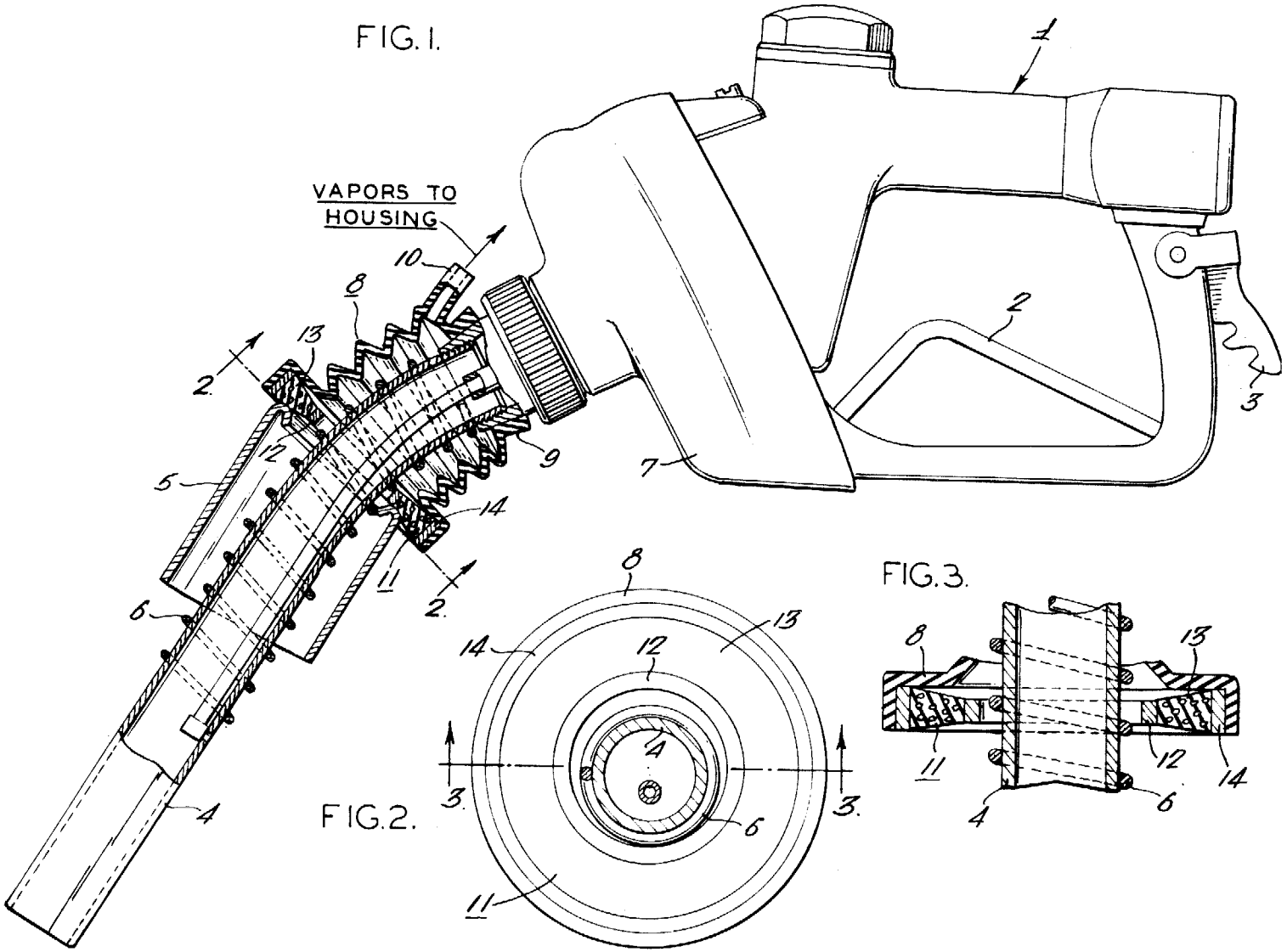
FIG. 1 is a combined elevational and cross-sectional view showing a dispensing nozzle equipped with the vapor seal arrangement of this invention, in dispensing position in a fillpipe.
FIG. 2 is a sectional view taken on line 2—2 of FIG. 1, on an enlarged scale.
FIG. 3 is a cross-section taken on line 3—3 of FIG. 2.

Referring now to the drawing, a gasoline dispensing nozzle 1, of a type widely used in the industry, is adapted to be connected to the outer end of a dispensing hose (not shown). The nozzle 1 has the usual pivotally-mounted lever 2 for operating a shut-off valve (not shown) which is located in the nozzle body, and also [is] *has* a conventional pivotally-mounted, spring-biased clip 3 which coacts with lever 2 to provide an arrangement for holding the shut-off valve open without the necessity of manually holding lever 2 in its "open" position. A discharge spout 4 is provided on nozzle 1, opposite the hose connection to the nozzle, this spout having a somewhat curved outer configuration such that it is readily insertable into the metallic fillpipe 5 of a motor vehicle fuel tank (not shown). The usual resilient clamp wire 6, wound around the outside of spout 4, assists in holding the nozzle spout in the fillpipe 5. Also, the usual soft, impact-absorbing rubber cover 7 is provided on the forward end of the body of nozzle 1. In FIG. 1, only the upper end of the fillpipe 5 is shown.

The foregoing has described certain distinctive features of a well-known and presently-existing gasoline dispensing nozzle. The attachment according to the present invention, which operates to provide a vapor-tight seal between the nozzle (or the spout attached thereto) and the fillpipe, so as to collect vapors displaced from the tank by the fuel being dispensed thereinto, will now be described.

A flexible bellows 8, made of a soft elastomeric or rubber-like synthetic material which is unaffected by gasoline, surrounds the spout 4 at the upper end thereof, adjacent the point of attachment of this spout to the nozzle proper.

At its upper end, the elongated hollow member or bellows 8 has an integral cylindrical portion or collar 9 which is adhesively or otherwise suitably secured in a vapor-tight manner to the outer cylindrical surface of the spout 4. The upper end of the bellows could be secured to or made integral with the lower end of the rubber cover 7.

At or near its upper end, the bellows 8 is provided with a tubular coupling 10, to which the outer end of a tube or hose (not shown) may be attached, for abstracting vapors from the interior of the bellows.

One face of a composite essentially flat annular or ring-shaped sealing assembly 11 is secured in vapor-tight fashion (adhesively, or in other suitable manner) to the lower end of bellows 8. The assembly 11 consists of three separate elements secured together in a concentric arrangement, an inner pole piece 12 of a low-carbon steel, an intermediate element 13 of the material commonly known as "magnetic rubber," and an outer pole piece 14 of a low-carbon steel. The elements 12–14 are all annular or ring-shaped, with the inner cylindrical wall of element 13 secured to the outer cylindrical wall of element 12, and with the outer cylindrical wall of element 13 secured to the inner cylindrical wall of element 14. The I.D. of element 12 is greater than the O.D. of spout 4, thus providing an annular space around the outside of this spout; this space provides a passage for vapors from the fillpipe 5 into the lower end of bellows 8. The axial length of the outer pole piece 14 is preferably greater than that of the inner pole piece 12, and the radial width of pole piece 14 is preferably somewhat less than that of pole piece 12 (see FIG. 3).

The material from which element 13 is made is rubber-like and contains imbedded magnetic particles, so as to render the element as a whole magnetic.

In use, when the spout 4 is inserted down into the fillpipe 5, the inherent resiliency of the bellows 8 provides enough downwardly-action force to position the sealing assembly 11 in contact with the outer end of the fillpipe 5. The magnetic attractive forces between the magnetic element 13 and the metallic fillpipe 5 then provide the force to make a flat face vapor-tight seal against the outer end of the fillpipe, thus forcing vapors which issue from this end of the fillpipe to travel through the annular space between the spout 4 and the inner diameter of element 12, into the interior of bellows 8. It may be noted here that the interior of bellows 8 is thus coupled to the fillpipe 5.

The ferromagnetic pole pieces 12 and 14 greatly enhance the strength of the magnetic attractive forces between the magnetic element 13 and the outer end of the metallic fillpipe 5.

As gasoline is used from a motor vehicle fuel tank, the empty space created in the tank by withdrawing gasoline fills with gasoline vapors that are generally in thermodynamic equilibrium with the liquid gasoline phase remaining in the tank. When the tank is refilled with gasoline by way of nozzle 1 and spout 4, these vapors are forced out of the tank and travel upwardly in fillpipe 5, to its upper end. These displaced vapors are forced to travel around the outside of spout 4 into the bellows 8, because of the vapor-tight seal between the outer end of fillpipe 5 and assembly 11. The displaced vapors are collected in the bellows 8 and are sent back to the housing of the gasoline dispensing apparatus through a hose which is strapped to the normal gasoline delivery hose and is connected at its outer end to the coupling 10 at the upper end of the bellows.

At the dispensing apparatus housing, the vapors can either be condensed and the condensate then fed into the dispensing hose, or they can be returned to the underground gasoline storage tanks by a suitable piping arrangement.

The vapor seal arrangement of this invention has several advantages, among which may be mentioned the following:

(1) The bellows and flat face seal combination can be attached to presently-used dispensing nozzles.

(2) The vapors can be returned to tthe dispensing apparatus housing, condensed, and then dispensed as fuel. This feature could prove to be economically attractive, since the displaced vapors contain hydrocarbons in the amount of approximately 0.2% of the fuel delivered.

(3) The recovery of the vapors ( as contrasted to their release to the atmosphere) reduces the fire hazard presented to the operator.

(4) If the vapors are collected, the hydrocarbons in the air can be substantially reduced, thus helping in the air pollution problem.

(5) With a face seal such as described, "blow-back" and spillage are substantially eliminated.

(6) Higher pumping rates are possible when using the attachment of this invention, as compared to a nozzle without the attachment.

(7) Less foam is developed during the tank filling operation, thus ensuring a sharper automatic shut-off for a "full" tank.

(8) No "top-off" is required, in contrast to a conventional nozzle.

It has been found, in tests carried out with a device actually built according to the teachings of this invention, that a fully vapor-tight seal can be formed with substantially all of the various vehicle gasoline tank fillpipes now in use and now known. Thus, the device has been proved to be very effective and efficient.

The invention claimed is:

[1. In combination, a liquid fuel dispensing nozzle with a discharge spout for insertion into the metallic fillpipe of a motor vehicle fuel tank, an elongated continuous imperforate flexible bellows of cylindrical outer configuration sealed at one end thereof to the body of said spout, said bellows surrounding said spout in spaced relation thereto to provide a chamber therearound, said chamber being coupled to the interior of said fillpipes; and separate means carried by the other end of said bellows for forming a positive flat face seal against the outer end of said fillpipe.]

[2. Combination of claim 1, including also a coupling at said one end of said bellows constructed and arranged to enable vapors to be abstracted from said chamber.]

[3. Combination according to claim 1, wherein said separate means includes a flat magnetic sealing element secured to said other end of said bellows and held against the outer end of said fillpipe by magnetic attractive forces.]

[4. Combination set forth in claim 3, including also a coupling at said one end of said bellows constructed and arranged to enable vapors to be abstracted from said chamber.]

*5. In combination, a liquid fuel dispensing nozzle with a discharge spout for insertion into the ferromagnetic fillpipe of a motor vehicle fuel tank, an elongated imperforate flexible bellows of cylindrical outer configuration sealed at one end thereof to the body of said spout, said bellows surrounding said spout in spaced relation thereto to provide a vapor receiving chamber therearound which is coupled to the interior of said fillpipe; and a continuous substantially flat sealing element of magnetic material secured to the other end of said bellows, said sealing element being held against the outer end of said fillpipe by magnetic attractive forces to thereby form a positive flat face seal against the outer end of said fillpipe.*

*6. Combination of Claim 5, including also a coupling adjacent said one end of said bellows and communicating with said chamber for enabling vapors to be abstracted from the interior thereof.*

*7. In combination, a liquid fuel dispensing nozzle with a discharge spout for insertion into the ferromagnetic fillpipe of a motor vehicle fuel tank, an elongated imperforate flexible tubular member sealed at one end thereof to the body of said spout, said member surrounding said spout in spaced relation thereto to provide a vapor receiving chamber therearound which is coupled to the interior of said fillpipe, and a continuous substantially flat sealing element of magnetic material secured to the other end of said member, said sealing element being held against the outer end of said fillpipe by magnetic attractive forces to thereby form a positive flat face seal against the outer end of said fillpipe.*

*8. Combination of Claim 5, including also a coupling adjacent said one end of said member and communicating with said chamber for enabling vapors to be abstracted from the interior thereof.*

*9. An elongated imperforate flexible tubular member adapted to be sealed at one end thereof to a dispensing nozzle discharge spout, said member being adapted to surround said spout to form a vapor receiving chamber therearound which is capable of being coupled to the interior of a motor vehicle fuel tank fillpipe; a coupling adjacent said one end of said member and communicating with said chamber for enabling vapors to be abstracted from the interior thereof, and a continuous substantially flat sealing element of magnetic material secured to the other end of said member, said sealing element being capable of being held against the outer end of such a fillpipe by magnetic attractive forces to thereby form a positive flat face seal against the outer end of such a fillpipe.*

(References on following page)

References Cited

The following references, cited by the Examiner, are of record in the patented file of this patent or the original patent.

UNITED STATES PATENTS

| | | | |
|---|---|---|---|
| 2,723,070 | 11/1955 | Merriam | 141—291 |
| 3,151,695 | 10/1964 | Mintz | 285—9 M |
| 2,990,198 | 6/1961 | Imming | 285—9 M |
| 3,616,622 | 11/1971 | Friedman | 285—9 M |
| 569,180 | 10/1896 | Donally | 141—290 |
| 2,803,269 | 8/1957 | Switzer | 141—290 |
| 2,908,299 | 10/1959 | Gosselin | 141—290 |
| 3,318,345 | 5/1967 | Beall | 141—59 |

FOREIGN PATENTS

| | | | |
|---|---|---|---|
| 1,292,909 | 4/1962 | France | 141—290 |
| 1,322,086 | 2/1963 | France | 141—290 |
| 119,493 | 8/1947 | Sweden | 141—290 |
| 1,163,062 | 2/1964 | Germany | 141—383 |

HOUSTON S. BELL, Jr., Primary Examiner

U.S. CL. X.R.

141—59, 97, 290, 392; 285—9 M